Sept. 16, 1924.  
H. G. WAGNER  
ELECTRIC STORAGE BATTERY CONSTRUCTION  
Filed Dec. 27, 1921  3 Sheets-Sheet 1

1,508,427

WITNESSES:  
INVENTOR  
Hugo G. Wagner  
BY Joshua R. H. Potts  
HIS ATTORNEY

Sept. 16, 1924.                                                          1,508,427
                                H. G. WAGNER
                     ELECTRIC STORAGE BATTERY CONSTRUCTION
                       Filed Dec. 27, 1921          3 Sheets-Sheet 2
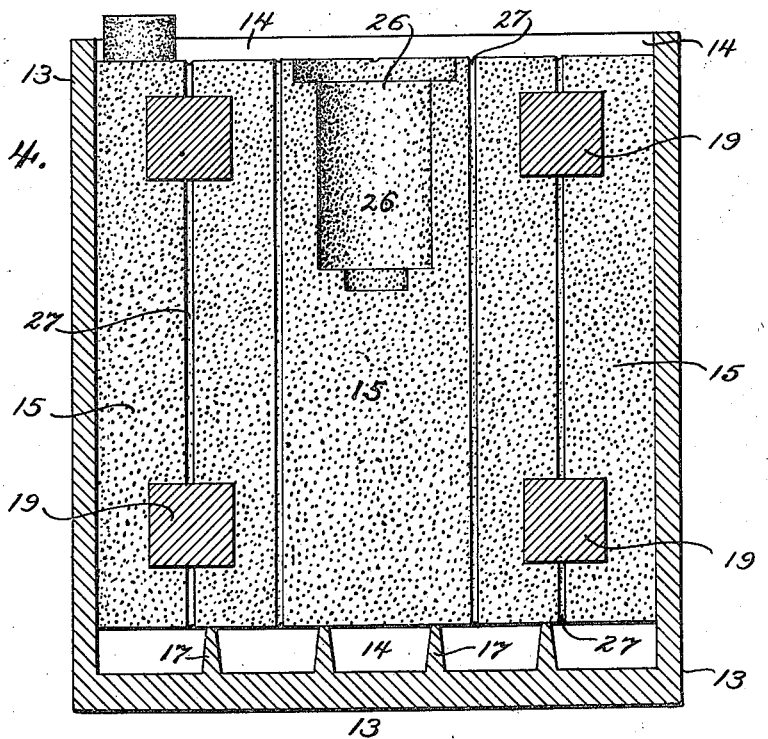
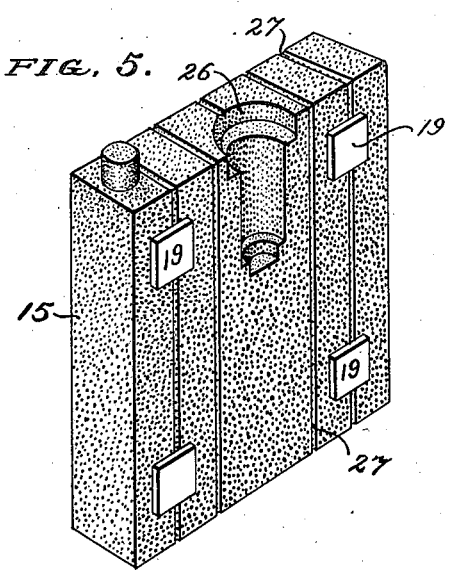
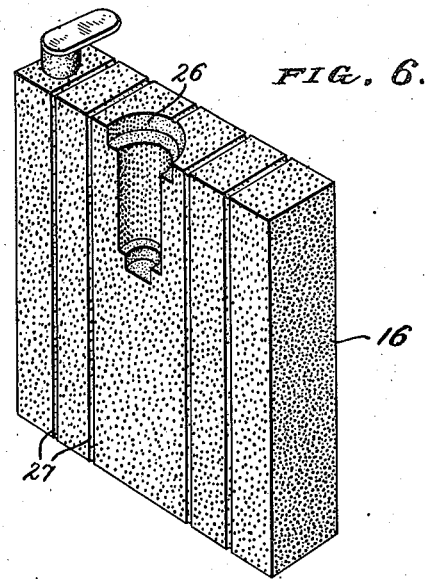
WITNESSES:                                              INVENTOR
Lynn Brodton                                          Hugo G. Wagner
Augustus B. Coppes                               BY Joshua R. H. Potts
                                                        HIS ATTORNEY Sept. 16, 1924.

H. G. WAGNER

ELECTRIC STORAGE BATTERY CONSTRUCTION

Filed Dec. 27, 1921    3 Sheets-Sheet 3

1,508,427

WITNESSES:
Lynn Brodton
Augustus B. Coppes

INVENTOR
Hugo G. Wagner
BY Joshua R. H. Potts
HIS ATTORNEY

Patented Sept. 16, 1924.

1,508,427

UNITED STATES PATENT OFFICE.

HUGO G. WAGNER, OF POINT PLEASANT BEACH, NEW JERSEY.

ELECTRIC STORAGE-BATTERY CONSTRUCTION.

Application filed December 27, 1921. Serial No. 524,891.

*To all whom it may concern:*

Be it known that I, HUGO G. WAGNER, a citizen of the United States, residing at Point Pleasant Beach, in the county of Ocean and State of New Jersey, have invented certain new and useful Improvements in Electric Storage-Battery Constructions, of which the following is a specification.

It is well known that in electric storage batteries which employ lead plates or grids co-active in boxes or receptacles containing dilute sulphuric acid, the structure is heavy, bulky and difficult to handle. Moreover the liquid or solution of dilute sulphuric acid is apt to splash out of its allotted space and for this reason the structure must be handled with care. Further than this, the construction and replacement is expensive considering the length of the life of the structure.

One object of my present invention is to provide an improved light weight construction for a storage battery which will do away with the necessity of having numerous heavy lead plates or grids.

Another object is to so construct my improved structure that the negative and positive elements will consist of porous blocks of material which will absorb a great quantity of the sulphuric acid and will therefore prevent the splashing and wasting of the sulphuric acid.

Further objects of my invention are to increase the length of life of electric storage batteries, to increase their effectiveness and to render them more compact and condensed These objects, and other advantageous ends which will be described hereinafter, I attain in the following manner, reference being had to the accompanying drawings in which—

Figure 1:
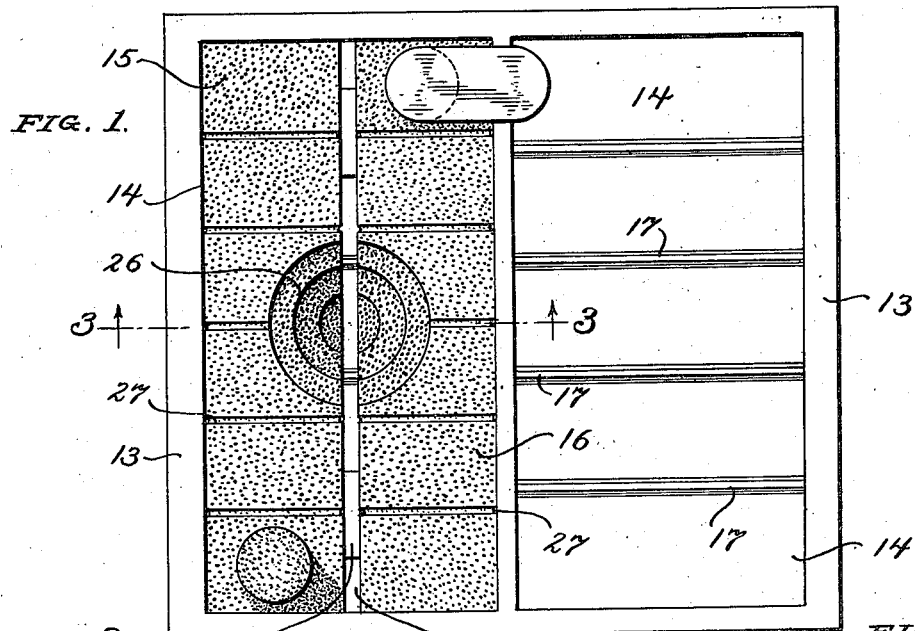
Figure 2:
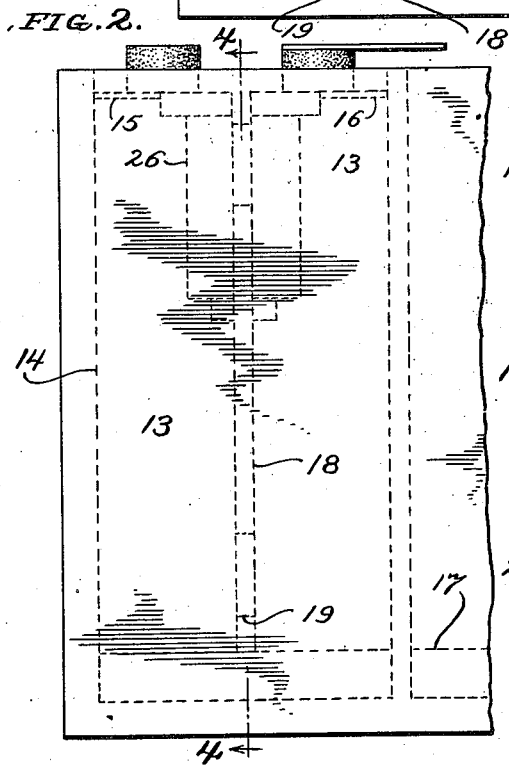
Figure 3:
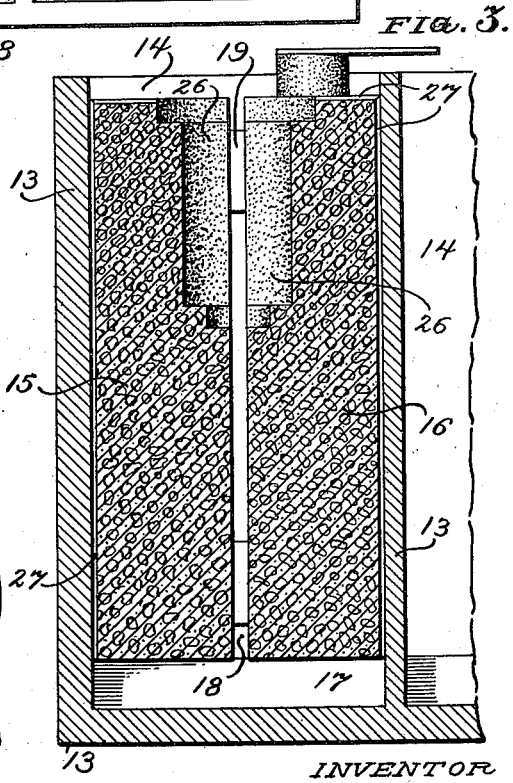
Figure 7:
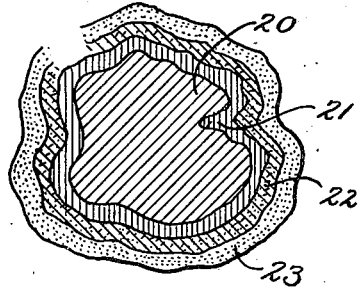
Figure 10:
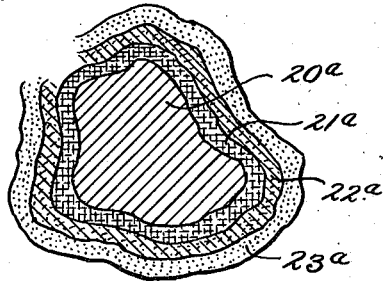
Figure 8:
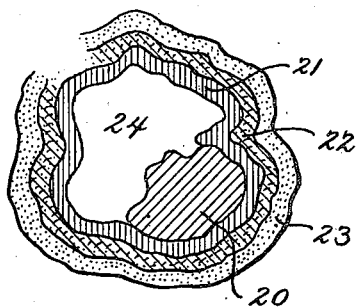
Figure 11:
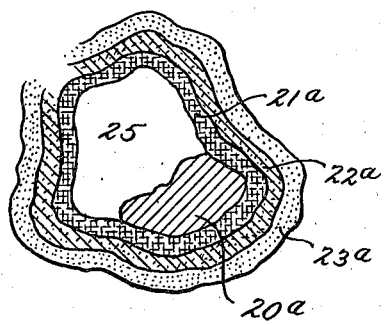
Figure 9:
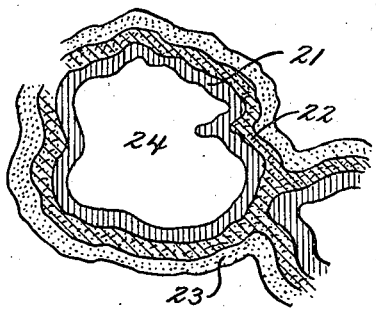
Figure 12:
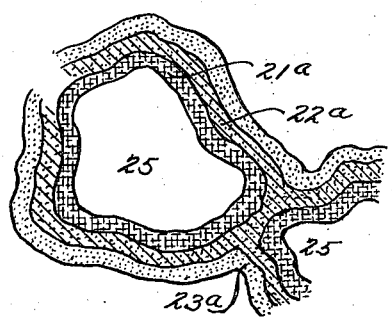

Figure 1 is a top plan view of an electric storage battery illustrating my invention; the same illustrating one cell of the battery including positive and negative elements or blocks made in accordance with my present invention, Figure 2 is a fragmentary front elevation of said battery, Figure 3 is a section taken on the line 3—3 of Figure 1, Figure 4 is a section taken on the line 4—4 of Figure 1, Figures 5 and 6 are perspective views of my improved positive and negative elements or blocks removed from the battery box, Figures 7, 8 and 9 are diagrammatic views illustrating in enlarged fragmentary section the character of the substances of the positive elements or block, and Figures 10, 11 and 12 are diagrammatic views illustrating in enlarged fragmentary section the character of the substances of the negative element or block.

Referring to the drawings, 13 represents a battery box which includes chambers 14. I have only illustrated two of these chambers. However, it will be understood that any number of chambers may be provided according to the size and strength of battery desired. I have illustrated in one of these chambers two approximately rectangular blocks 15 and 16 which rest on ribs 17 projecting up from the bottom of the box; said ribs being spaced apart to provide passages for sulphuric acid which is placed in the chamber in which the blocks 15 and 16 are positioned. These blocks with the exception of a comparatively narrow space 18 between them approximately fill the chamber; the block 15 constituting the positive element of the battery and the block 16 constituting the negative element of the battery.

These blocks 15 and 16 are made of porous light weight material such for example as claimed in my co-pending application for United States Patent, Serial No. 524,890. The box 13 is made of acid resistant electrically non-conductive material and the blocks 15 and 16 are separated by spacing members 19 and if desired these members 19, which are of electrically non-conductive material, can be secured to one of the blocks such for example as to the block 15 as shown in Figure 5. The blocks 15 and 16 are made porous throughout their mass so that when the sulphuric acid is placed within the chamber in which the blocks are located, the blocks will absorb a great quantity of the sulphuric acid and said acid will be held by said blocks and the action of the sulphuric acid relatively to certain of the ingredients of the blocks will effect the accumulation and the conduction of electricity. The character of the substance contained in the blocks 15 and 16 is practically the same in each instance with the exception that while both of the blocks contain accumulator oxide, the accumulator oxide in one of the blocks is of a different re-active character than the accumulator oxide in the other of the blocks.

In preparing the material for the positive block 15, I first take a coarse wood such for example as a mass of saw dust and soak said mass of saw dust in a solution of ammonium sulphate until the particles of wood are thoroughly soaked with said ammonium sulphate and swelled to a size greater than their original size. I allow this action to take place until the wood will absorb no more of the ammonium sulphate and said wood is then placed on a suitable drain so as to allow the draining off of all excess ammonium sulphate. This wood after being drained and still holding its swelled and enlarged shape is then rolled or mixed with an "accumulator oxide" known in the art as the "active material" and for the production of the material used in producing a positive element, this active material can consist of lead per oxide in powder form. This action is continued until the surface of each individual unit of wood is completely covered with said active material. The saturated wood thus coated is then rolled or mixed with a carbon until every unit containing the wood and oxide is completely covered with the carbon at which time these units are rolled in a calcined calcium sulphate. The entire mass thus obtained is molded in the shape of the block 15; the hardening and setting of the entire mass depending on the quantity of calcined calcium sulphate and ammonium sulphate used. The chemical action of the calcined calcium and the ammonium sulphate causes the entire mass to set and harden holding the wood in its swelled state. The block thus formed is then placed in a dry room at a temperature of approximately 250° F. until all the moisture is expelled. The block at this state is very porous; the voids being caused by the moisture taken out of the wood reducing it to its first dry or normal state. After this drying action the block of material is then placed in a suitable container having therein sulphuric acid preferably of a specific gravity of 1.2 until all the wood is destroyed; thus making the block ready for use as the positive element in the chamber 14 of the battery box 13.

The ammonium sulphate solution which I use preferably has a specific gravity of 1.142.

The above steps of the process of making the material of the block 15 are illustrated in Figures 7 to 9 inclusive; Figure 7 showing on an enlarged scale a particle of wood 20 having been treated by the ammonium sulphate solution so as to swell the same; said particle of wood being covered by a coating of accumulator oxide such for example as powdered lead per oxide 21; this coating being covered by carbon 22; there being an outer covering of calcium sulphate 23; thus completing a unit of the mass. Figure 8 illustrates the same after the drying or baking step of the process in which the particle of wood has been reduced in size to provide a void 24 and Figure 9 illustrates the structure after having been treated with sulphuric acid to completely destroy the wood and increase the size of the void 24.

In the formation of the material for the negative block 16, the process is similar with the exception that the accumulator oxide forming the active material is preferably made of powdered metallic lead. In Figures 10 to 12 inclusive, I have illustrated the formation of said negative block material in which 20$^a$ represents a particle of wood on an enlarged scale having been treated with ammonium sulphate solution, then covered with the active material 21$^a$ which is preferably made of the powdered metallic lead above noted, then this coated structure is covered with a coating of carbon 22$^a$ and finally covered with a coating of calcium sulphate 23$^a$. Figure 11 illustrates the same after having been dried to reduce the size of the wood particle 20$^a$ and to create a void 25 and Figure 12 illustrates the structure after the wood has been destroyed by sulphuric acid to enlarge the size of the void 25.

Each of the blocks 15 and 16 is provided with a recess 26 which, when the blocks are placed adjacent each other within the chamber 14, provide a cavity for the insertion of a testing instrument and also for allowing the water and acid to be inserted conveniently and I preferably provide grooves 27 in the outer surfaces of the blocks in order to increase the surface area and facilitate the absorption of the sulphuric acid by the blocks.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what

I claim as new and desire to secure by Letters Patent is:—

1. In an electric storage battery, positive and negative elements consisting of porous blocks composed of ammonium sulphate, carbon, an accumulator oxide and calcined calcium sulphate.

2. In an electric storage battery, positive and negative elements consisting of porous blocks composed of ammonium sulphate, carbon, an accumulator oxide and calcined calcium sulphate, the blocks being honeycombed with voids of larger dimensions than the pores.

In testimony whereof I have signed my name to this specification in the presence of two subscribing witnesses.

HUGO G. WAGNER.

Witnesses:
WILLIAM J. DOONER,
ELIZABETH GARBE.